United States Patent
Kawamura

[11] Patent Number: 6,089,020
[45] Date of Patent: Jul. 18, 2000

[54] HEAT RECOVERING APPARATUS FOR COGENERATION SYSTEM WITH A TURBOCHARGED ENGINE

[75] Inventor: Hideo Kawamura, Kanagawa-ken, Japan

[73] Assignee: Isuzu Ceramics Research Institute Co., Ltd., Kanagawa-ken, Japan

[21] Appl. No.: 08/903,443

[22] Filed: Jul. 30, 1997

[30] Foreign Application Priority Data

Nov. 18, 1996 [JP] Japan ................................. 8-321182

[51] Int. Cl.⁷ ............................................ F02B 37/00
[52] U.S. Cl. ........................ 60/618; 165/159; 165/905; 165/907
[58] Field of Search ................ 60/618; 165/159, 165/905, 907

[56] References Cited

U.S. PATENT DOCUMENTS

| | | | |
|---|---|---|---|
| 4,026,746 | 5/1977 | Straw | 165/905 |
| 4,222,434 | 9/1980 | Clyde | 165/905 |
| 5,194,154 | 3/1993 | Moyer et al. | |

FOREIGN PATENT DOCUMENTS

| | | |
|---|---|---|
| 0141634 | 5/1985 | European Pat. Off. |
| 0294146 | 12/1988 | European Pat. Off. |
| 6-033707 | 2/1994 | Japan |
| 6-108865 | 4/1994 | Japan ....................................... 60/618 |
| 9-217624 | 8/1997 | Japan |
| 9317470 | 12/1997 | Japan |
| 9317471 | 12/1997 | Japan |
| 9218822 | 10/1992 | WIPO |
| 9616000 | 5/1996 | WIPO |

OTHER PUBLICATIONS

Japanese Abstract 06033707, vol. 18, No. 249, Feb. 8, 1994.

*Primary Examiner*—Michael Koczo
*Attorney, Agent, or Firm*—Browdy and Neimark

[57] ABSTRACT

This heat recovering apparatus for a cogeneration system with an engine comprises a turbocharger driven by an exhaust gas, an energy recovering turbine provided on the downstream side of the turbocharger, and a heat exchanger provided on the downstream side of the energy recovering turbine. The energy recovering turbine comprises a gas turbine driven by an exhaust gas, and a steam turbine driven by steam occurring in the heat exchanger. The heat exchanger comprises a casing joined to an exhaust gas passage, oxidation resisting ceramic pipes, in which the water and steam flow, provided in the casing, and oxidation resisting ceramic porous members, through which an exhaust gas can pass, provided in the portions of the interior of the casing which are on the outer sides of the ceramic pipes.

6 Claims, 3 Drawing Sheets

HEAT RECOVERING APPARATUS FOR COGENERATION SYSTEM WITH A TURBOCHARGED ENGINE

BACKGROUND OF THE INVENTION

1. Field of the Invention

This invention relates to a heat recovering apparatus for a feeding engine, that is, a cogeneration system with an engine, adapted to recover the thermal energy of an exhaust gas as electric energy and hot water supplying energy by a heat exchanger.

2. Description of the Prior Art

In a diesel engine, light oil is generally burnt as a fuel in a combustion chamber. The light oil has a high cetane value and not so high a viscosity, and is suitable to disperse an atomized fuel uniformly into a combustion chamber. In order to greatly reduce the particulates and NOx components in an exhaust gas from a recent diesel engine, the air is compressed under a high pressure in a combustion chamber, and a fuel is injected into the resultant air, whereby the atomization of a gaseous mixture in the combustion chamber is attained. In general, the fuels used in an engine include gasoline, light oil, natural gas and heavy oil. A conventional generating set of a cogeneration system mostly comprises a system in which a generator is mounted on an engine. Since a diesel engine uses light oil as a fuel, the fuel cost increases in the generation of electricity by a diesel engine, so that an advantage concerning the generating cost cannot be secured.

A conventional cogeneration type engine using natural gas as a fuel is disclosed in, for example, Japanese Patent Laid-Open No. 33707/1994. This cogeneration type engine is adapted to generate steam by the exhaust gas energy, and the steam energy is recovered as electric energy, whereby a thermal efficiency is improved. In this engine, a turbocharger is driven by the exhaust gas energy, and a generator-carrying energy recovering apparatus by the exhaust gas energy from the turbocharger. The thermal energy of the exhaust gas from the energy recovering apparatus is converted into steam in a first heat exchanger, and a steam turbine is driven by this steam to recover the energy as electric energy, hot water being generated in a second heat exchanger by the high-temperature steam from the steam turbine to utilize the hot water as hot water to be supplied.

If heavy oil can be utilized as a fuel in a feeder using a diesel engine, the fuel cost can be reduced greatly. Therefore, in order to inject heavy oil at a high pressure into a combustion chamber, it is conceivable to give fluidity to the heavy oil by heating the same.

The applicant then developed diesel engines using heavy oil as a fuel, and filed patent applications therefor which included, for example, Japanese Patent Application Nos. 46956/1996, 151910/1996 and 151911/1996.

In a diesel engine, substantially 50% of the energy of a fuel is discharged in the form of exhaust gas. Therefore, when a diesel engine has been spread as a feeding engine throughout urban areas, the thermal energy discharged in the form of an exhaust gas poses problems. Namely, when the exhaust gas from an engine is discharged as it is to the atmospheric air, the ambient temperature increases to cause the environmental condition to be deteriorated. Moreover, the fuel cost increases, so that problems with saving of resources arise.

The recovering of the thermal energy of an exhaust gas discharged from an engine can be attained by providing a turbocharger and an energy recovering turbine in an exhaust pipe. For example, when an exhaust gas has 900° C. thermal energy, a part of the energy is recovered by a turbocharger, and the temperature of the exhaust gas discharged from the turbocharger decreases to around 600° C. The exhaust gas discharged from the turbocharger is passed through the energy recovering turbine, whereby the thermal energy is recovered to cause the temperature of the exhaust gas to decrease to around 500° C. In order to further recover the thermal energy of the exhaust gas discharged from the energy recovering turbine, and reduce the temperature of the exhaust gas, a heat exchanger is provided on the downstream side of the energy recovering turbine.

In a cogeneration system with an engine comprising a diesel engine, it is necessary that a thermal efficiency be improved by using heavy oil or natural gas as a fuel and thereby reducing the fuel cost, and that the environmental condition be not deteriorated by the thermal energy discharged from the engine. Especially, in an urban area, it is necessary that the influence of the heat of the exhaust gas discharged from an engine be reduced. Therefore, a feeding engine has a problem of effectively recovering the thermal energy from an exhaust gas therefrom. To solve this problem, it is necessary that the construction of a heat exchanger, through which an exhaust gas and water are passed, be developed so as to enable the thermal energy of an exhaust gas to be recovered effectively, and excellent corrosion resistance, thermal resistance and durability to be displayed with respect to an exhaust gas and water.

SUMMARY OF THE INVENTION

An object of the present invention is to solve these problems, and provide a heat recovering apparatus for a cogeneration system with an engine, that is, a feeding engine, which is adapted to reduce the bad influence of thermal energy upon the environment by providing in an exhaust gas passage a turbocharger having a generator driven by an exhaust gas discharged from the engine, and an energy recovering turbine, and reducing the temperature of an exhaust gas of around 500° C. discharged from the energy recovering turbine to around 100° C. by passing this exhaust gas through a heat exchanger provided on the downstream side of the same turbine, and which is formed out of a corrosion resisting and oxidation resisting ceramic material so as not to corrode the heat exchanger with the exhaust gas and so as to improve the durability thereof.

The present invention relates to a heat recovering apparatus for a cogeneration system with an engine, comprising a turbocharger driven by an exhaust gas from an engine and provided in an exhaust gas passage, a generator-carrying energy recovering turbine provided in the portion of the exhaust gas passage which is on the downstream side of the turbocharger, and a heat exchanger provided in the portion of the exhaust gas passage which is on the downstream side of the energy recovering turbine, the energy recovering turbine comprising two vane wheels of a gas turbine driven by an exhaust gas discharged from the turbocharger and a steam turbine driven by the steam generated in the heat exchanger, and a rotor, the heat exchanger comprising a casing joined to the exhaust gas passage, oxidation resisting ceramic pipes, through which water and steam flow, provided in the casing, and oxidation resisting ceramic porous members, through which the exhaust gas can flow, provided in the portions of the interior of the casing which are on the outer sides of the ceramic pipes so as to be unitarily combined with the ceramic pipes.

The turbocharger is formed by providing a generator therein so that both supercharging and power generation can be carried out.

Ceramic lattices or porous materials are provided in the ceramic pipes in the heat exchanger.

The ceramic porous members and ceramic pipes referred to above are formed out of corrosion resisting and oxidation resisting silicon nitride, silicon carbide or aluminum nitride.

A fine ceramic film on an inner surface of each ceramic pipe in which water and steam flow is formed by coating the inner surface with polymer precursor by passing polymer precursor under a high pressure through the pipe, and then sintering the resultant product. Accordingly, even when cracks or holes exist in such an inner surface, they are covered or closed with the fine ceramic film, so that water or steam does not leak to the outside through the pipe. Since the outer surface of this pipe is formed so as to have minute recesses and projections, the water can be subjected to heat exchange effectively with an exhaust gas flowing outside the pipe, so that the water can be converted into steam.

Each of the ceramic porous members comprises a reaction sintered ceramic material having a plurality of continuous open pores and formed by impregnate-mixing a nonwoven cloth, which is obtained by tubularly forming a ceramic fibrous material, with Si and $Si_3N_4$, reaction sintering this mixed material to obtain a calcined tubular body, applying a thermally incineratable porous material to the outer surface of the calcined tubular body, pouring a ceramic slurry into the porous material to obtain a molded body, and sintering this molded body in a $N_2$ gas. Therefore, the ceramic porous member has a plurality of continuous open pores, through which an exhaust gas flows smoothly, and these open pores enable a heat exchange surface area to increase greatly, and the water flowing in the pipes buried in the ceramic porous member to be converted into steam efficiently.

Since this heat recovering apparatus for feeding engines is thus formed, the thermal energy of the exhaust gas is recovered as electric energy by the turbocharger and energy recovering turbine, and the thermal energy of the steam, which is converted from water in the heat exchanger, as electric energy by the steam turbine in the energy recovering turbine, the hot water occurring in the heat exchanger being recovered as hot water supplying energy.

The temperature of an exhaust gas which has passed through the turbocharger and then the energy recovering turbine decreases to around 500° C., and, when the exhaust gas further passes through the heat exchanger, the water is converted into steam. Therefore, the thermal energy of the exhaust gas is effectively recovered. Namely, the thermal energy of the exhaust gas discharged from the engine is recovered sufficiently as electric energy and steam turbine driving energy, and the temperature of the exhaust gas discharged to the atmospheric air decreases satisfactorily to around 100° C. Consequently, the thermal energy discharged from the engine can be minimized, and does not adversely affect the environment.

Although an exhaust gas contains various kinds of oxides and active oxygen, the heat exchanger is formed out of an acid resisting ceramic material, such as $Si_3N_4$ or SiC, so that the durability of the heat exchanger can be improved.

Since this heat recovering apparatus for feeding engines is formed as described above, the thermal energy of an exhaust gas discharged from a diesel engine is recovered by the turbocharger, energy recovering turbine and heat exchanger, and does not cause the temperature of the outside air to increase. Therefore, for example, when a diesel engine is operated in an urban area, it does not deteriorate the environmental condition.

Accordingly, this heat recovering apparatus for feeding engines can be applied to, for example, a stationary type cogeneration feeding apparatus using a large-sized fuel tank, in which it is possible to utilize heavy oil as a fuel effectively, reduce the fuel cost and electric power cost greatly, and use the apparatus in and out of season, i.e., throughout the year. In short, this apparatus is very preferable.

DESCRIPTION OF THE PREFERRED EMBODIMENTS

Figure 1:
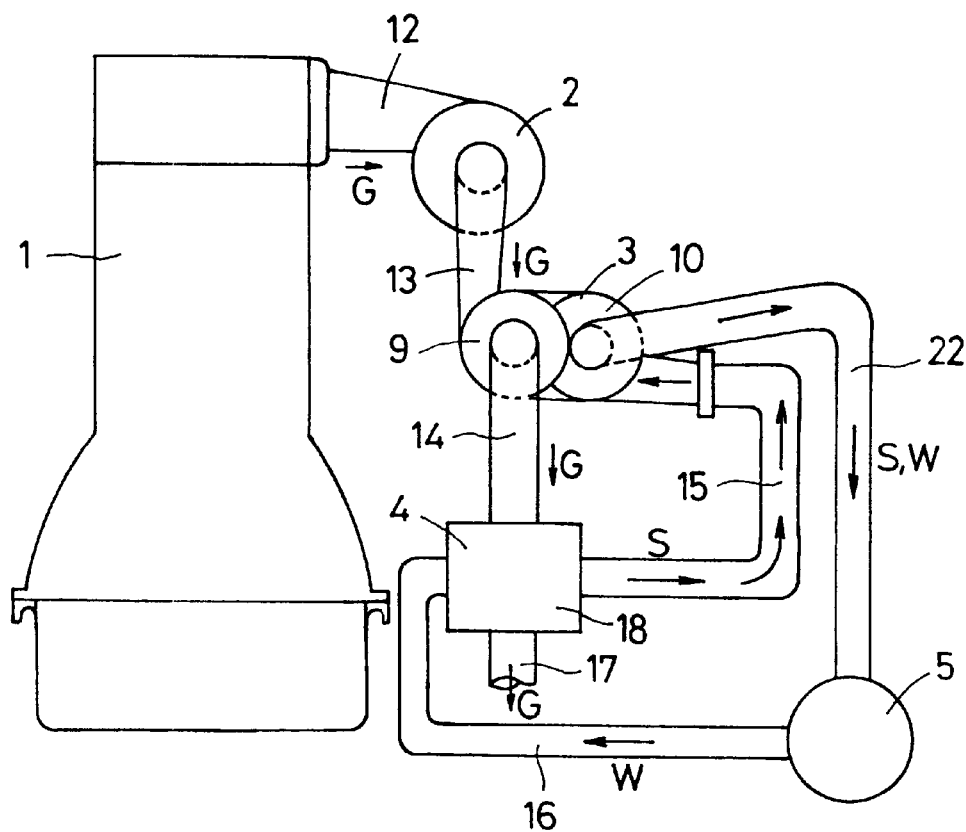
FIG. 1 is a schematic explanatory view showing an embodiment of the heat recovering apparatus for a cogeneration system with an engine according to the present invention.
Figure 2:
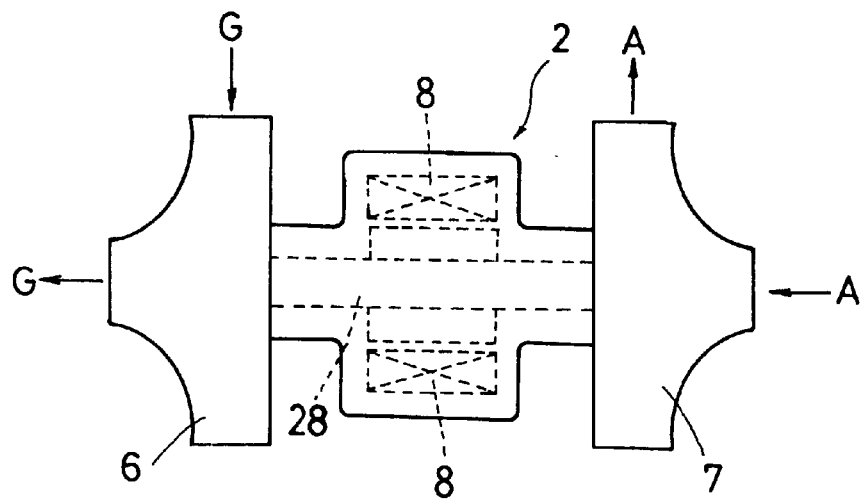
FIG. 2 is a schematic explanatory view showing a turbocharger in the heat recovering apparatus for the engine of FIG. 1.
Figure 3:
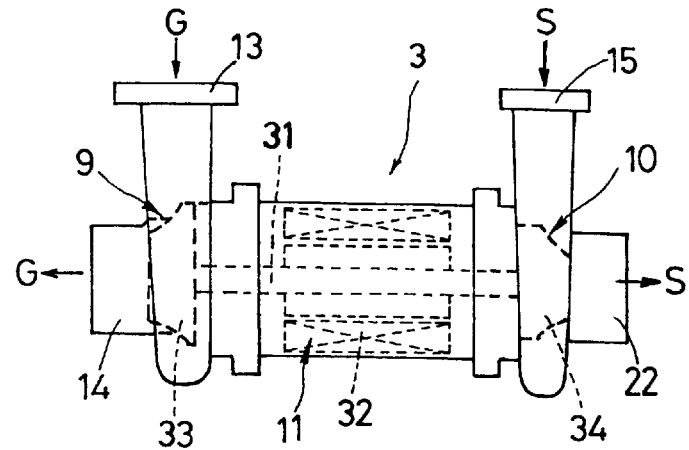
FIG. 3 is a schematic explanatory view showing an energy recovering turbine in the heat recovering apparatus for the engine of FIG. 1.

An embodiment of the heat recovering apparatus for a cogeneration system with an engine, that is, a feeding engine according to the present invention will now be described with reference to the drawings.

This heat recovering apparatus can be applied to the cogeneration type engine disclosed in Japanese Patent Laid-Open No. 33707/1994 filed by the inventor of the present invention, and the feeding cogeneration type engines using a diesel engine, provided with a large-sized fuel tank and disclosed in the abovementioned Japanese Patent Application Nos. 46956/1996, 151910/1996 and 151911/1996. A diesel engine is operated by repeating four strokes, for example, a suction stroke, a compression stroke, an expansion stroke and an exhaust stroke, and has, for example, a primary chamber of a heat insulating structure formed in a cylinder, a swirl chamber formed in a cylinder head and communicating with the primary chamber through communication ports, and a piston reciprocatingly moved in the cylinder.

This heat recovering apparatus for a cogeneration system with an engine has mainly a turbocharger 2 adapted to be driven by an exhaust gas G from a diesel engine 1, and provided with a generator 8 installed in an exhaust gas passage 12, an energy recovering turbine 3 having a generator 11 and provided in an exhaust gas passage 13 which is on the downstream side of the turbocharger 2, and a heat exchanger 4 provided in an exhaust gas passage 14 which is on the downstream side of the energy recovering turbine 3. The turbocharger 2 comprises a turbine 6 driven by the exhaust gas G, a compressor 7 connected to the turbine 6 via a shaft 23, and a generator (AC machine) 8 mounted on the shaft 28. The compressor 7 is adapted to suck the air A and supply the same as suction air to the engine 1. The electric power generated by the generator 8 in the turbocharger 2 is consumed as feeding power, and a part of the electric power is accumulated in a battery (not shown). The generator 8 may not necessarily be provided in the turbocharger 2.

The energy recovering turbine 3 comprises a gas turbine 9 driven by an exhaust gas discharged from the turbocharger 2 through the exhaust gas passage 13, a steam turbine 10 driven by the steam S occurring in the heat exchanger 4, and a generator 11 adapted to convert the rotational force of the gas turbine 9 and steam turbine 10 into electric power. Namely, the energy recovering turbine 3 has a vane wheel 33 of the gas turbine 9, a vane wheel 34 of the steam turbine 10, and a rotor 32 constituting the generator 11 mounted on a shaft 31 connecting the two vane wheels 33, 34 together. The gas turbine 9 can be formed in the same manner as the turbine 6 in the turbocharger 2. In the gas turbine 9, the vane wheel is formed out of a ceramic material so as to have a thermal resistance to the exhaust gas G and a corrosion resistance. In the steam turbine 10, the vane wheel comprises parts of a material, such as a ceramic material so as to have a corrosion resistance to the steam S. The energy recovering turbine 3 is formed with consideration given to a thrust force occurring in the exhaust gas turbine 9 and steam turbine 10 and the matching of the parts with one another on the same shaft.

A passage 22, in which temperature-dropped steam S and moisture flow, at an outlet side of the steam turbine 10 is provided with a condenser 5, in which the steam S and moisture are converted into water W, the water W being circulated to the heat exchanger 4 through a water passage 16. In this system, the condenser 5 functions as a kind of accumulator and works as an aid for effecting a smooth circulation of water and steam. In the steam turbine 10, the blades are formed out of a ceramic material so as to improve the durability thereof, and a housing constituting a scroll a ceramic material as well. The electric power generated by the generator 11 in the energy recovering turbine 3 is consumed as feeding power, and the remaining electric power is accumulated in a battery (not shown).

The heat exchanger 4 comprises a casing 18 (18A, 18B) connected to the exhaust gas passage 14 which is on the downstream side of the energy recovering turbine 3, oxidation resisting ceramic pipes 19, in which water and steam flow, provided in the casing 18, and oxidation resisting ceramic porous members 20, through which the exhaust gas G can pass, provided on the outer sides of the ceramic pipes 19 in the casing 18. The casing 18 is produced by forming either one 18A or 18B of casing members tubularly, and the other casing member as covers for closing both ends of the tubular member. In each of the ceramic pipes 19, ceramic lattices or a porous material 21 is provided. The temperature of the exhaust gas G which has passed through the heat exchanger 4 decreases to, for example, not higher than 100° C., and this exhaust gas is discharged to the outside air through an exhaust gas passage 17, and, in some cases, through a muffler and a diesel particulate filter.

Figure 6:
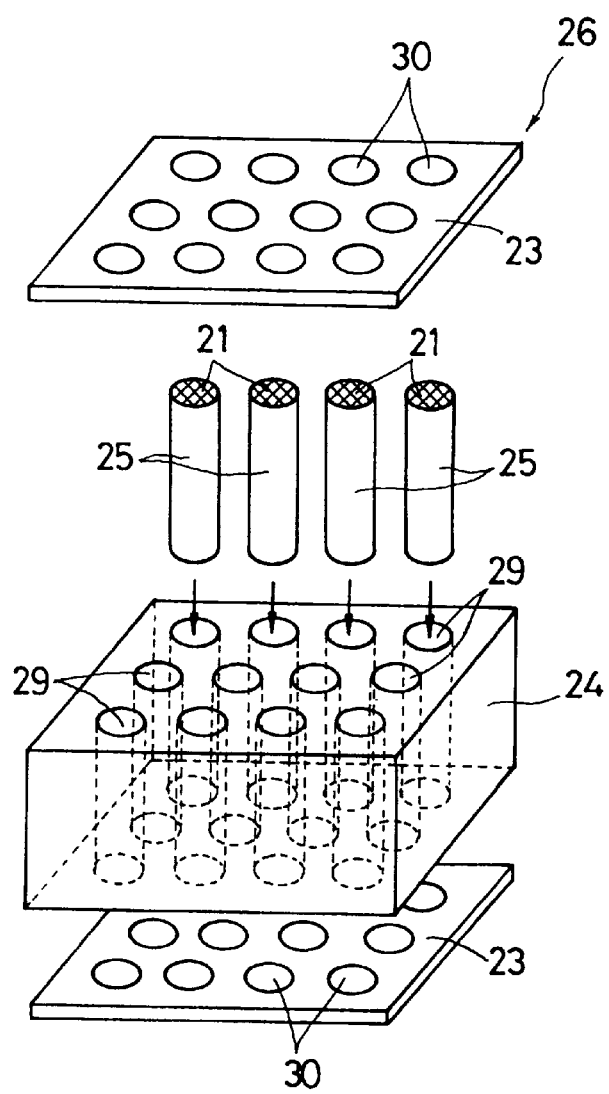
FIG. 6 is an exploded explanatory view of a molded body showing the steps of manufacturing the heat exchanger of FIG. 4.

The ceramic porous members 20 and ceramic pipes 19 are formed out of corrosion- and oxidation-resisting silicon nitride, silicon carbide or aluminum nitride, and water and steam flow therein. The ceramic porous member 20 and ceramic pipes 19 are formed by, for example, reaction sintering a slurry, with which a porous member 24, which is shown in an exploded state in FIG. 6, is impregnated, and a molded body 26.

First, a synthetic members of tubular nonwoven cloths and pulverized bodies are prepared from a mixed material obtained by impregnate-mixing a ceramic fibrous material of silicon nitride, silicon carbide or aluminum nitride with Si and $Si_3N_4$ powder, and the tubular nonwoven cloths comprising the mixed material is reaction sintered in a $N_2$ gas, whereby tubular calcined members 25 are made. A polymer precursor (precursor of silicon nitride) is then passed under a high pressure through the tubular calcined members 25 so as to apply the polymer precursor to the inner surfaces of these members 25 or impregnate the same inner surfaces therewith. As shown in FIG. 6, the ceramic plates 23 of calcined bodies are provided with holes 30 in which the tubular calcined members 25 are to be fitted, and the porous member 24 of polyurethane foam or rubber foam which is thermally incinerated during the sintering thereof bores 29 through which the tubular calcined members 25 are to be passed. The ceramic plates 23 are provided on both end surfaces of the porous member 24, and the tubular calcined members 25 are set through the holes 30 of the ceramic plates 23 and the bores 29 of the porous member 24. The tubular calcined members 25 are provided therein with ceramic lattices or a ceramic porous material, and an assembly of these parts is then placed in a mold. A ceramic slurry is then poured into the porous member 24 provided on the outer sides of the tubular calcined members 25 to form the molded body 26. The molded body 26 is reaction sintered in a $N_2$ gas so as to thermally sinter the porous member 24, whereby a plurality of continuous open pores are formed therein. The ceramic slurry is sintered to a reaction sintered ceramic material, and the tubular calcined members 25 are turned into ceramic pipes 19. The reaction sintered ceramic material constitute the ceramic porous members 20. Ceramic films 27 into which the polymer precursor has been converted are formed on the inner surfaces of the ceramic pipes 19. The ceramic plates 23 function as shielding plates in the heat exchanger 4.

The sintered body constituting the heat exchanger 4 is formed in the above-described manner, to provide a structure in which the ceramic pipes 19 are buried in the ceramic porous members 20. The sintered body made in the above-described manner is placed in a space formed by the casing members 18A, 18B, and the exhaust gas passages 14, 17 are joined to the casing member 18B, the water passage 16 and steam passage 15 being joined to the casing member 18A, whereby the heat exchanger 4 is formed. In the heat exchanger 4, the ceramic films 27 on the ceramic pipes 19 and the ceramicplates 23 are formed so as to fulfil the function of shielding plates for shielding the exhaust gas and the water or steam from each other in the casing members 18A, 18B.

Figure 4:
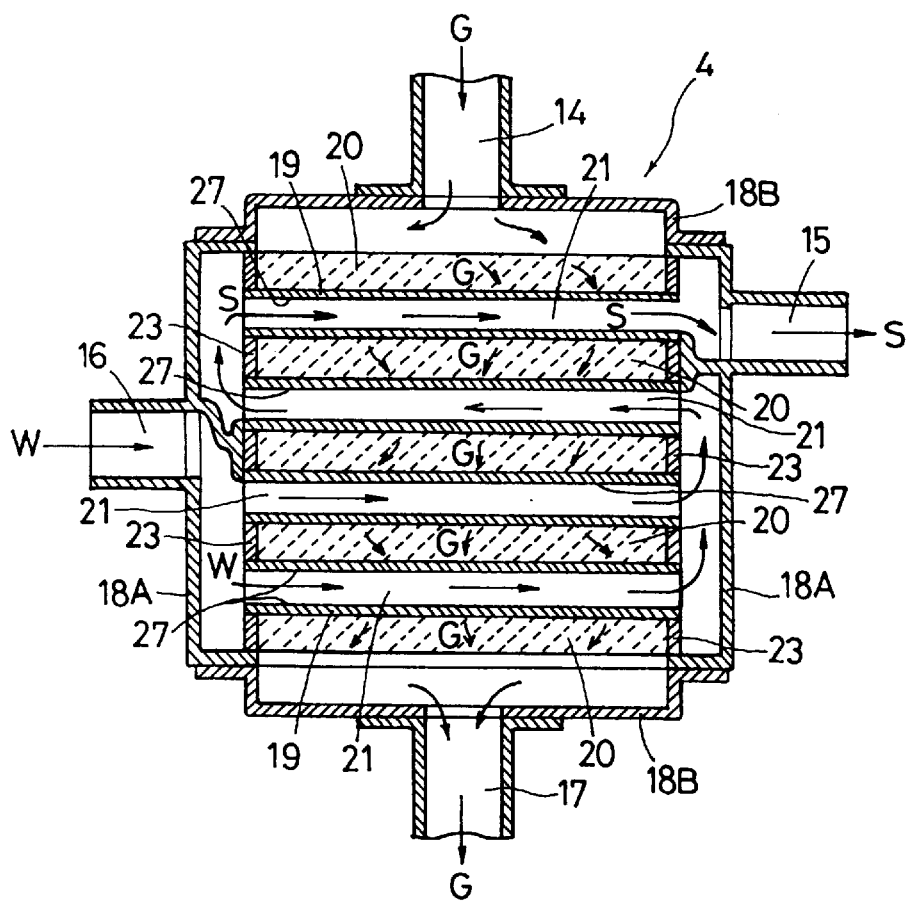
FIG. 4 is a sectional view showing a heat exchanger in the energy recovering apparatus for the cogeneration system with the engine of FIG. 1.
Figure 5:
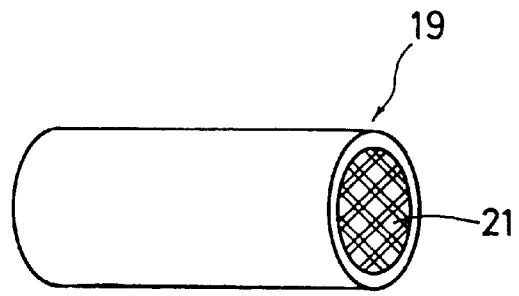
FIG. 5 is a sectional view showing a ceramic pipe in the heat exchanger of FIG. 4.

As shown in FIG. 4, the exhaust gas G enters the heat exchanger 4 via the exhaust gas passage 14, and carries out heat exchange with the ceramic pipes 19 as it passes through the ceramic porous members 20 having a plurality of open pores, the exhaust gas being then discharged from the exhaust passage 17. The water W enters the heat exchanger 4 via the water passage 16, and receives thermal energy from the exhaust gas G as it passes through the ceramic pipes 19, to turn into steam S, which is sent from the steam passage 15 to the steam turbine 10.

What is claimed is:

1. A heat recovering apparatus for a cogeneration system with an engine comprising:

a turbocharger driven by an exhaust gas from an engine and provided in an exhaust gas passage, an energy recovering turbine provided in the portion of said exhaust gas passage which is on the downstream side of said turbocharger and having a first generator, and a heat exchanger provided in the portion of said exhaust gas passage which is on the downstream side of said energy recovering turbine, said energy recovering turbine being provided with a gas turbine driven by an exhaust gas discharged from said turbocharger, and a steam turbine driven by steam generated in said heat exchanger, said heat exchanger comprising a casing joined to said exhaust gas passage, oxidation resisting ceramic pipes, through which water and steam flow, provided in said casing, and oxidation resisting ceramic porous members, through which said exhaust gas can flow, provided in the portions of the interior of said casing which are on the outer sides of said ceramic pipes so as to unitarily combined with said ceramic pipes, wherein at least one of lattices and porous materials is provided in said ceramic pipes in said heat exchanger.

2. A heat recovering apparatus for a cogeneration system with an engine according to claim 1, wherein said ceramic porous members and said ceramic pipes are formed of a material selected from the group consisting of silicon nitride, silicon carbide and aluminum nitride, which has corrosion resisting and oxidation resisting properties.

3. A heat recovering apparatus for a cogeneration system with an engine according to claim 1, wherein fine ceramic films are provided on inner surfaces of said ceramic pipes within which water and steam can flow, said fine ceramic films being made of coatings of sintered polymer precursor.

4. A heat covering apparatus for a cogeneration system with an engine according to claim 1, wherein said ceramic porous members which are on the outer sides of ceramic pipes are each composed of a reaction sintered ceramic material having therein continuous open pores.

5. A heat recovering apparatus for a cogeneration system with an engine according to claim 1, wherein said energy recovering turbine comprises a first vane wheel constituting a gas turbine, a first shaft on one end portion of which said first vane wheel is mounted, a rotor mounted on said first shaft and constituting said first generator, and a second vane wheel mounted on the other end portion of said first shaft and constituting said steam turbine, the generation of electric power being able to be carried out by said first generator.

6. A heat recovering apparatus for a cogeneration system with an engine according to claim 1, wherein said turbocharger comprising a turbine driven by an exhaust gas from said engine, a second shaft on one end portion of which said turbine is mounted, a second generator mounted on said second shaft, and a compressor mounted on the other end portion of said second shaft, the supercharging by said compressor and the generation of electric power by said second generator being able to be carried out.

* * * * *